US009545173B2

United States Patent
Brown

(10) Patent No.: US 9,545,173 B2
(45) Date of Patent: Jan. 17, 2017

(54) DUAL PURPOSE SINGLE USE WOOD GRILL BRUSH AND METHOD

(71) Applicant: Everette Brown, Murrells Inlet, SC (US)

(72) Inventor: Everette Brown, Murrells Inlet, SC (US)

(*) Notice: Subject to any disclaimer, the term of this patent is extended or adjusted under 35 U.S.C. 154(b) by 71 days.

(21) Appl. No.: 14/266,588

(22) Filed: Apr. 30, 2014

(65) Prior Publication Data

US 2015/0313249 A1 Nov. 5, 2015

(51) Int. Cl.
*A47J 37/00* (2006.01)
*B08B 1/00* (2006.01)
(Continued)

(52) U.S. Cl.
CPC ............ *A47J 37/0786* (2013.01); *A23B 4/052* (2013.01); *A23B 4/0523* (2013.01); *A46B 9/005* (2013.01);
(Continued)

(58) Field of Classification Search
CPC ............ A46B 5/00; A46B 9/00; A46B 9/005; A46B 9/02; A46B 15/00; A46B 15/0055; A46B 15/0081; A46B 2200/01; A46B 2200/30; A46B 2200/3033; A46B 2200/3073; A46B 2200/40; A46B 2200/405; B08B 1/00; B08B 1/001; B08B 1/002; B08B 1/005; B08B 7/00; B08B 7/04; B08B 2240/00; B08B 2230/00; A47L 13/02; A47L 13/022; A47L 13/08; A47L 25/00; A47L 17/00;A47L 17/04; A47L 17/06; A23B 4/044; A23B 4/052; A47J 37/0786; A47J 43/28; A47J 43/288; A21B 3/16; F23H 15/00; F23J 1/00; F23J 1/04
(Continued)

(56) References Cited

U.S. PATENT DOCUMENTS 2,331,412 A * 10/1943 Miller ...................... A46D 1/00
15/187
2,719,316 A * 10/1955 Hauser .................... A47L 13/08
15/105
(Continued)

FOREIGN PATENT DOCUMENTS

CA 2386483 * 11/2003

*Primary Examiner* — Mark Spisich
(74) *Attorney, Agent, or Firm* — L. LawtonRogers, III

(57) ABSTRACT

A dual purpose, single use wood grill brush for cleaning a grilling surface and thereafter providing a flavor enhancing smoke. The device is a thin sheet of wood selected for the flavor enhancing characteristics of the smoke therefrom when slowly burned, which sheet is desirably soaked in water to make the wood flexible so that it may be manually used to clean the grilling surface prior to grilling, and then deposited on the heat source where it smokes rather than flames because of the absorbed water content. Exposing the food being grilled to such smoke during the grilling process provide a unique flavor to the food. One embodiment of the device includes a flat edge on one end and a plurality of longitudinally extending fingers at the other end, both useful in the cleaning process. Other embodiments of the device specifically for grilling surfaces with spaced parallel rods include a thin sheet of wood with notches for selectively cleaning the entire surface of the rods. Methods are also disclosed.

13 Claims, 3 Drawing Sheets

(51) Int. Cl.
*A47L 13/02* (2006.01)
*A47J 37/07* (2006.01)
*A23B 4/052* (2006.01)
*A47J 43/28* (2006.01)
*A47L 17/06* (2006.01)
*A46B 15/00* (2006.01)
*A46B 9/00* (2006.01)

(52) U.S. Cl.
CPC .......... *A46B 15/0081* (2013.01); *A47J 43/288* (2013.01); *A47L 13/02* (2013.01); *A47L 17/06* (2013.01); *B08B 1/00* (2013.01); *A46B 2200/01* (2013.01); *A46B 2200/3033* (2013.01); *A46B 2200/40* (2013.01)

(58) Field of Classification Search
USPC ........ 15/104.001, 105, 111, 142, 159.1, 160, 15/186, 187, 236.01, 236.05–236.09; 99/467, 99/482, 484, 646 R; 126/25 R, 126/29, 173
See application file for complete search history.

(56) References Cited

U.S. PATENT DOCUMENTS

| | | | | |
|---|---|---|---|---|
| 4,553,279 | A * | 11/1985 | Gassew | A46B 17/06 15/105 |
| 4,801,166 | A * | 1/1989 | Jordan | A47J 43/288 294/10 |
| 5,509,167 | A * | 4/1996 | Wilson | A47L 23/04 15/236.06 |
| 2011/0088265 | A1* | 4/2011 | Madren | A47J 43/288 30/169 |
| 2011/0258801 | A1* | 10/2011 | Thompson | A47L 17/06 15/236.01 |

* cited by examiner

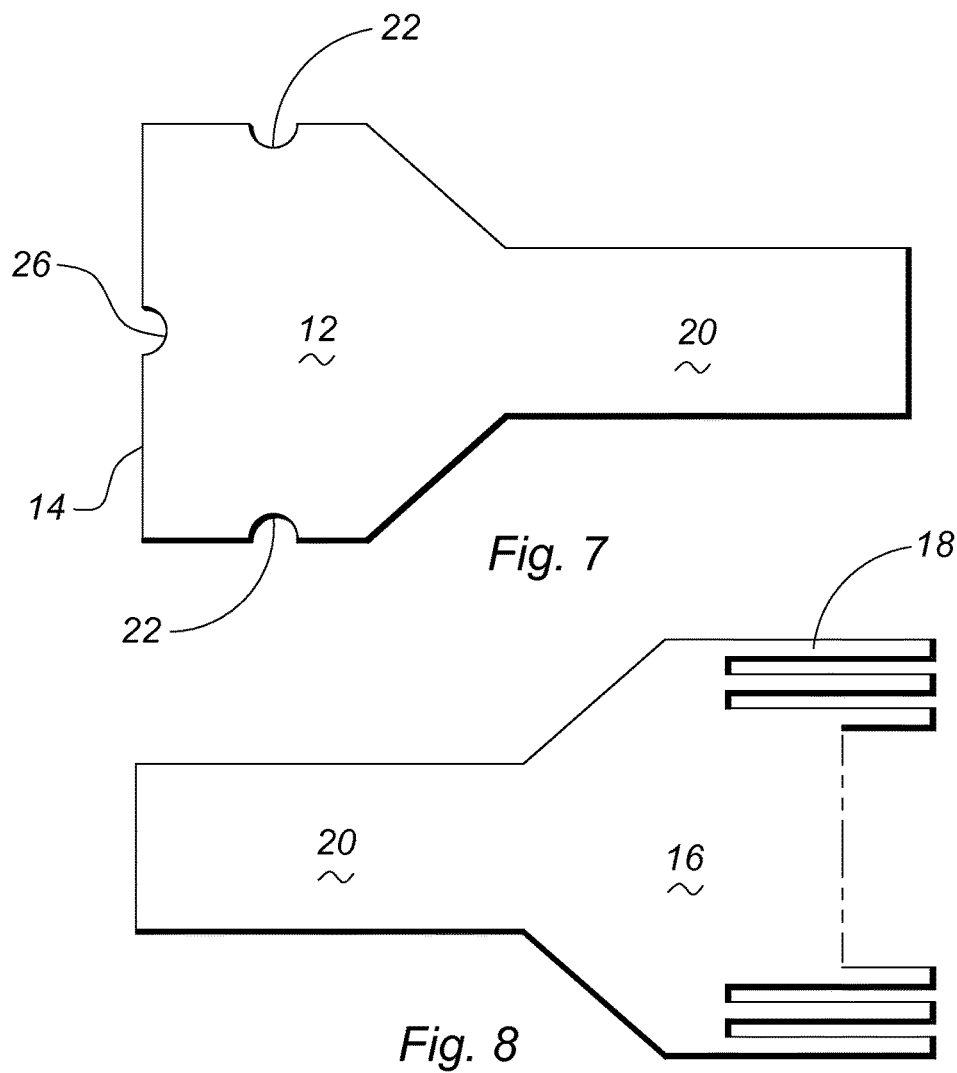
Fig. 7
Fig. 8
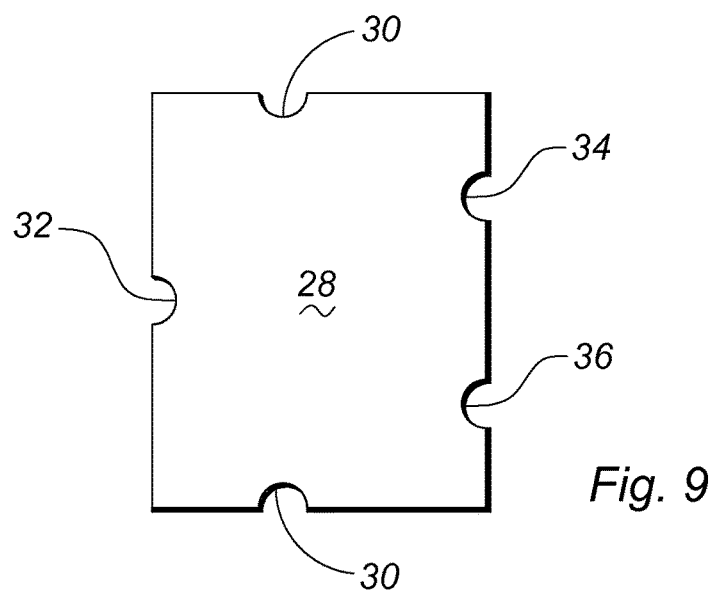
Fig. 9

DUAL PURPOSE SINGLE USE WOOD GRILL BRUSH AND METHOD

FIELD OF THE INVENTION

The present invention relates to grilling and more specifically to (a) cleaning the grilling surface prior to placing food thereon to be grilled and (b) providing a flavor enhancing smoke during the grilling process.

BACKGROUND OF THE INVENTION

Outdoor grills are extremely popular. They are commonly found on wheels on the back porches and balconies of homes and apartments, as permanent installations on patios and in back yards, and alongside the picnic tables at camp sites in many parks and other outdoor recreational areas.

Cleaning the Grilling Surface.

The most common grilling surface for home owner use is a rod or wire grate positioned over charcoal briquettes, i.e. a series of spaced-apart, parallel, cylindrical cross-section rods on which the food to be grilled is placed. The rods are typically about 5/32" in diameter with a spacing of about 1/2". It is more common for the rods for gas or electric grills to non-circular or flattened, typically about 3/8" wide with W spacing. Plates of slit and expanded metal with their pattern of diamond-shaped openings are more common for large or commercial grills.

All grilling surfaces have to support the food being cooked above the heat source while at the same time permitting access of heat and flavor enhancing smoke to the food. The result of the grilling process is generally the accumulation on the grilling surface of charred bits of food, sauces and carbon from the heat source ("debris") which has to be removed before the grill can again be used.

A great many devices have been used to clear this debris, many of them brushes containing metallic bristles. Examples of such known devices are disclosed in the U.S. Pat. No. 6,916,382 to Alderidge; U.S. Pat. No. 7,039,983 to Outlaw; Publication US 2005/0086755 to Dulles; and Publication No. US2005/90160544 to Geller. There is a risk of serious injury from individual bristles which on occasion become lodged in the debris during the brushing process, are transferred to the food being grilled, and are consumed.

Other known devices employ scrubbing pads or soft brushes of various materials. Examples of such devices are disclosed in the U.S. Pat. No. 6,276,023 to Grundy; Publication No. US 2013/0061411 to Witzel et al.; Publication No. US 2012/0060864 to Nowakowski, and Publication No. US 2006/0207042 to Rolston. While such devices avoid the health risk of wire bristles, and while they are generally effective in superficially cleaning a grilling surface, they are often ineffective in removing debris because the lack of rigidity of the brush bristles pad material prevents the application of sufficient mechanical force to clean the grilling surface.

Still other known devices are made of rigid metal and are configured to conform to the rod surface to mechanically scrape debris from one, sometimes two, rods at a time. Examples of such scrapers are disclosed in U.S. Pat. No. 4,668,302 to Kolodziej; U.S. Pat. No. 4,214,342 to Amundsen; and Publication No. US 2013/0104331 to Leis. Where the grilling surface is a sheet of expanded metal, such devices are ineffective because they do not conform to the spaced diamond-shaped openings. Where the grilling surface is parallel wire rods, the scraping of one rod at a time is time consuming and, while effective in dislodging debris from the upper surface of the rods, the cleaning of the rods may be unsatisfactory because of the debris accumulated on the sides and even underneath the rods in the grilling process.

All of the foregoing devices are multiple use devices, and are retained for subsequent uses, often without cleaning. The accumulation of fungus or bacteria on such devices creates a health risk. In addition, the eventual disposal of such metallic or plastic devices in landfills is problematical.

Flavoring by Smoking.

It is also common when grilling to add a flavor to the food being grilled by placing wood chips on the heat source, which chips have been water soaked to provide the flavor enhancing smoke over a longer combustion period rather than flaming which reduces the combustion period, provides less smoke and may be detrimental to the grilling process. Woods such as hickory, mesquite and alder, and the fruit woods such as apple or cherry, provide smoke which adds a unique flavor to the food grilled. None of the foregoing known grill surface cleaning devices have any utility in providing a flavor enhancing smoke during the grilling process.

One known device, disclosed in US Publication No. US 2011/0258801 to Thompson et al., comprises a rigid wooden paddle for mechanically scraping a grilling surface of spaced rods, where the scraping surface is conformed to the spaced rods by repeated use over heated rods, i.e., the rods burn a conforming indentation into the scraping surface through repeated use of the device. The species of wood is said to be selected to apply a "seasoning" to the rods which "seasoning" is said to transferred to the food placed on the rods for grilling. No data is provided and the efficacy of seasoning food in this manner is highly doubtful. Because the wooden paddle is retained for many uses, it suffers from many of the deficiencies described above.

SUMMARY OF THE INVENTION

The device of the present invention is a single use combination of a grilling surface scraper/cleaner and a flavor inducing smoking agent. In its simplest form, the device may be a thin sheet of wood which (a) may be soaked in water sufficiently to become flexible enough to resist breakage when used to clean the grilling surface and to reduce the combustibility of the device, (b) may be used to scrape debris from the grilling surface, and (c) may be deposited on the heat source for slow combustion to provide a flavor inducing smoke during the subsequent grilling process.

THE DRAWINGS

Figure 6:
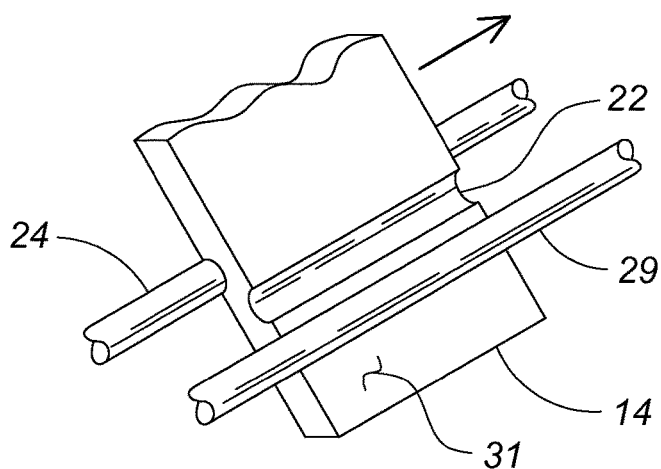

FIG. 6 is a pictorial illustration of a slightly thicker embodiment of the device with the grooves 25 being used as a guide and scraping one rod 24 and the opposite edge surface 31 scraping the immediately adjacent rod 29 as the device is manually moved longitudinally of the rods of the grill.

FIG. 7 is a top plan view of a handle and edge scraper embodiment of the present invention.

FIG. 8 is a top plan view of handle and finger scraper embodiment of the present invention.

FIG. 9 is a top plan view of a short edge scraper embodiment of the present invention without the handle.

THE DETAILED DESCRIPTION OF PREFERRED EMBODIMENTS

Figure 1:
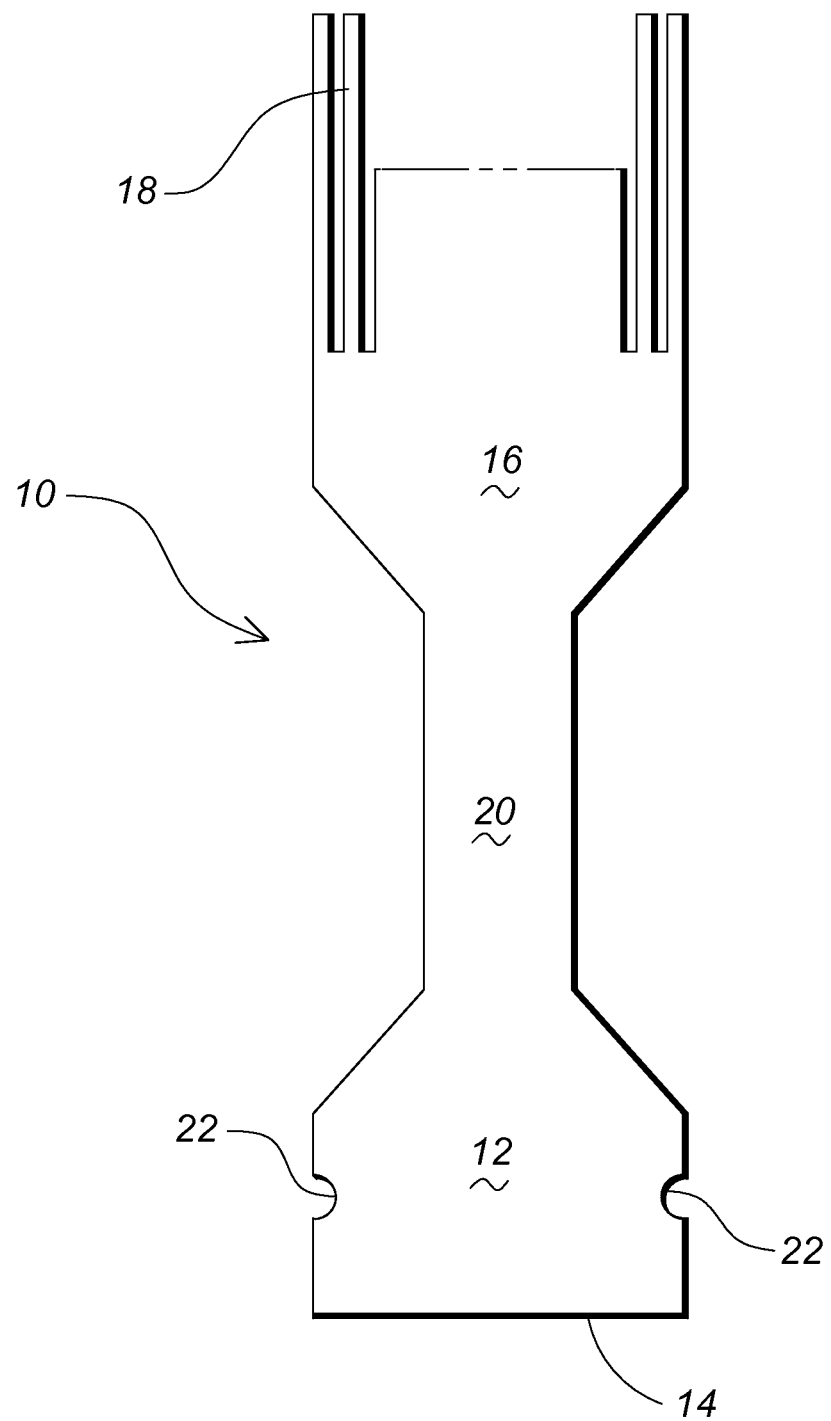
FIG. 1 is a top plan view of one embodiment of the present invention.

With reference to the drawings where like elements have been give the same number, and particularly to FIG. 1 where a preferred embodiment of the device of the present invention is illustrated, the device 10 is made from a thin sheet of wood. The thickness of the sheet is generally uniform and is between about 1/32" and about 5/16", preferably between and 1/16" and about 3/16", selected because of the water absorbing and grain characteristics thereof as discussed infra. The length of the sheet is desirably less than about 12" to facilitate the use thereof by one hand.

The wood may be selected for the flavor desired to be imparted to the food, and may, by way of example, be hickory, mesquite, alder or any of the fruit woods such as apple or cherry, the smoke from which is known to impart a distinctive flavor to food.

With continued reference to the embodiment of FIG. 1, one longitudinal end thereof 12 is desirably shaped to provide a flat surface 14 suitable for a course or rough scraping of debris from the grilling surface. The other longitudinal end thereof 16 may be provided with a plurality of fingers 18 to provide a finer cleaning of the grilling surface as hereinafter described. Intermediate the ends 12 and 16 is a handle portion 20 sized and shaped to facilitate gripping by the human hand for the manual application of either end 14, 18 to the grilling surface.

Figure 2:
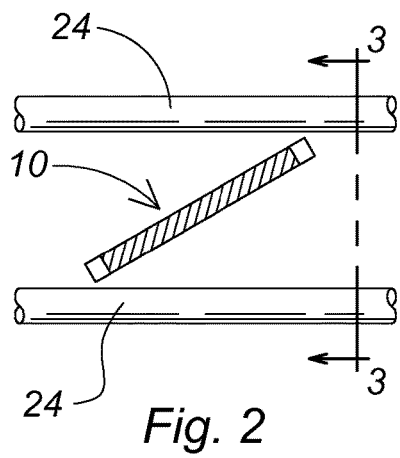
FIG. 2 is a pictorial illustration of a horizontal section taken just above the rods of a grilling surface showing the insertion of the device vertically downward between two adjacent rods.
Figure 3:
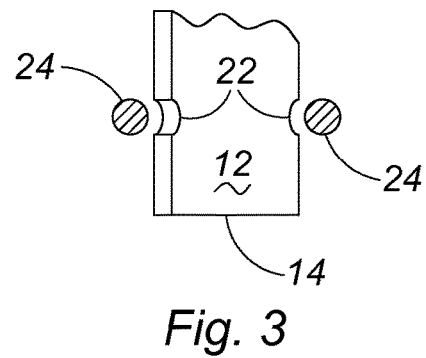
FIG. 3 is a pictorial illustration of a vertical section taken through lines 3-3 of FIG. 2.

Note in FIG. 1 the notches 22 on the course scraping end 12 of the device 10. These notches may be used when the rods of the grilling surface accumulate debris on the sides and even the lower surfaces thereof. The width of the device 10 is greater than the spacing between the rods 24 of a grilling surface. As illustrated in FIG. 2, the end 12 of the device may be lowered between two adjacent rods 24 with the flat plane of the device roughly paralleling the rods 24 to bring the notches 22 into registration with, but spaced from, the rods 24 as shown in FIG. 3.

Figure 4:
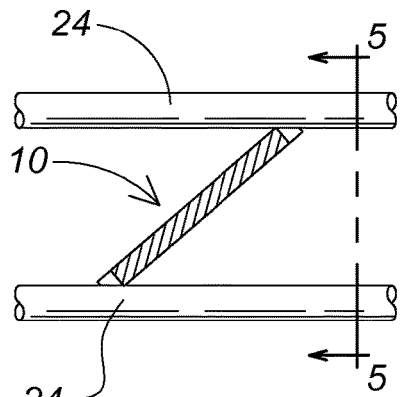
FIG. 4 is a pictorial illustration of a horizontal section taken just above the rods of a grilling surface showing the rotation of the device illustrated in FIG. 2 about the longitudinal axis thereof into contact with the rods.
Figure 5:
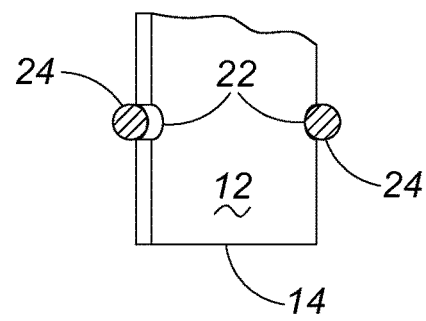
FIG. 5 is a pictorial illustration of a vertical section taken through lines 5-5 of FIG. 4.

As shown in FIG. 4 and FIG. 5, the device 10 may then be rotated about the longitudinal axis of the device to bring the notches 22 into contact with the rods 24 and the device 10 manually moved along the length of the rods 24 to scrape debris from the sides and bottom of the rods 24 to complete the course scraping of the rods 24.

With reference to FIG. 6, in embodiments where the thickness of the sheet 12 permits, the notches 22 may be moved from the lateral edge surface to the top and bottom surfaces where they become elongated grooves across the width of the device. The device may be inserted parallel to the rods 24 and tilted so that one groove engages one of the rods 24 and the flat surface of the device contacts the adjacent rod 29. The device may then be slid edge first along the length of the rods to remove debris from the sides of the rods.

With reference again to FIG. 1, the width of the device is desirably between about 1" and 4" with a number of parallel fingers or integral wooden bristles 18 extending from the end of the device and formed unitarily with the device by parallel slots. The device is desirably constructed with the grain of the wood running longitudinally of the device. Each of the fingers 18 is desirably between about 1 and about 5 inches in length, preferably between about 2 and about 4 inches in length. The fingers 18 may all be the same length or variable in length to provide a variable finger stiffness. Each of said fingers 18 is desirably between about 1/16" and about 1/4" in width, preferably between about 1/8" and 3/32". Each of said fingers 18 is desirably separated from the immediately adjacent finger by a distance not less than about 1/32" and about 5/16", preferably about 1/16", so that each finger may act somewhat independently of the other fingers when scraping the grilling surface.

It has been found that the individual fingers or bristles 18 will move laterally and twist as they slide along the rods of a grilling surface. In use with an expanded metal grilling surface, the independent action of the fingers is highly desirable in cleaning debris accumulated in the diamond shaped openings thereof, and movement across the grilling surface in a direction normal to the long axis of the diamond slots has been found highly effective. The length of the fingers may be varied and/or the width of the individual finger 18 varied across the width of the device to provide a variable stiffness to the fingers.

The device 10 is desirably soaked in water before being used to clean the grilling surface, and the amount of time to be soaked will be a function of (a) the species and gran of the wood from which the device is constructed and (b) the amount of debris on the grilling surface, e.g., between about 3 and about 10 minutes is enough for most woods for use in cleaning a moderately dirty grilling surface such as a grilling surface that has been used for grilling steaks, but 30 minutes or more may be desirable. The species of wood and the tightness of the grain will understandably affect the absorption characteristics of the sheet. The user will quickly develop a feel for the length of time required for the wood to absorb sufficient moisture to prevent the possible longitudinal splitting of the device or the breaking of the fingers during the cleaning of the grilling surface. The amount of moisture in the wood when the device is thereafter placed on or near the heat source during the grilling process will determine the tendency of the device to smolder and generate the desired flavor imparting smoke.

Where the heat source is charcoal briquettes or the like, the soaked device may be placed directly on the coals. Where the grill is gas fired or electric, it may not be desirable to expose the heat source to the ash from the combustion of the device. In such cases, the soaked device may be placed in a smoke box or smoke tray if one is provided by the grill manufacturer, or manually created from aluminum foil. The soaked device may be easily broken into smaller pieces if necessary to fit into a smoke box or desirable to have multiple smoke sources.

With reference to the handled edge scraper shown in FIG. 7, the device finds utility without the fingered scraper of FIG. 1. In addition to the notches 22 in the lateral sides of the scraper body 12 for scraping the hemispherical sides of adjacent rods in a grilling surface, the lateral end may also contain a notch 26 for use in scraping the hemispherical top of such rods. Because the top surface generally has the most debris, it may be necessary to use the device to scrape the upper surfaces with the edge 14 and/or the notch 26 before using the notches 22 on the facing surfaces of adjacent rods in the manner described in connection with FIG. 2-6. However, the notches 22 are generally effective in scraping debris up to the vertical, so that scraping of a rod from both sides will clean the entire upper surface. In some embodiments (not shown), the notches 22 may be of different distances from the edge 14 to provide a tilt to the device, thus rotating the area of the rods being cleaned. Alternating the top and bottom of the device will of course provide an overlap of the top and bottom hemispheres of the rods.

With reference to the handled finger scraper shown in FIG. 8, the device finds utility without the edge scraper of FIGS. 1 and 7. In such embodiments it may be desirable to shorten the length of the fingers to increase the stiffness thereof without negatively impacting the independent action of adjacent fingers 18. The embodiment of FIG. 8 finds particular utility when used in connection with expanded metal grilling surfaces.

With reference to the handle-less edge scraper shown in FIG. 9, the device comprises a thin sheet of wood with notches in the edges. This embodiment may be square or nearly so, and grasped by the fingers of one hand in the central area 28 to facilitate the rotation of the device to bring into play the various notches, e.g., notches 30 may be used for cleaning the side surfaces of adjacent rods, and pairs of notches 32,34 and 32,36 used where some tilt to the device is desirable as described in connection with FIG. 7. Where the scaping of the rods of the grilling surface permit, the two notches 34.36 may be used to scrape two adjacent rods. Of course, all four surfaces may be used to scrape the top surface of the rods.

ADVANTAGES AND SCOPE OF INVENTION

The device of the present invention is inexpensive and disposable, intended to be used but once in cleaning the grilling surface and thereafter consumed to provide a flavor enhancing smoke in the grilling process, and is thus environmentally advantageous.

The device of the present invention performs two highly desirable and heretofore independent grilling functions—the scraping/cleaning of the grilling surface and the providing of a flavor inducing smoke—in a single disposable device.

The device and method of the present invention are applicable to both of the most popular grilling surfaces—plural spaced-apart parallel rods and expanded sheet metal.

Among the advantages of the device of the present invention is that it is inexpensive to make, small in size, easy to store, easy to use in cleaning both of the common types of grilling surfaces, and disposable, with the further advantage in that it is combustible after the cleaning process eliminating the disposal problem to provide a flavor enhancing smoke during the grilling process.

The device and method of the present invention may be used to clean the sides and bottom surface of rod grills as well as the upper surface.

Another advantage of the method of the present invention is the speed with which the grilling surface can be prepared to receive food thereon, i.e., the surface is not required to be heated before being cleaned.

These and many other objects and advantages will be readily apparent from the foregoing detailed description of preferred embodiments when read in conjunction with the appended claims, which are to be limited only by the language thereof when accorded a full range of equivalents.

What I claim is:

1. A dual purpose, single use device for a grilling surface overlying a heat source for cleaning the grilling surface and thereafter producing a flavor enhancing smoke device, said device comprising a sheet of a wood,
    said sheet of wood being between about $1/32$ and $5/16$ inches in thickness and between about 1" and about 4" in width,
    said sheet of wood having a plurality of fingers formed unitarily therewith by parallel slots that extend longitudinally from one edge thereof a distance between about 1" and about 5", and
    said sheet of wood (a) having the capacity to provide a flavor enhancing smoke when slowly combusted, and (b) having the capacity to absorbing sufficient water to (i) resist breakage when used to clean the grilling surface and (ii) to reduce the combustibility of the device sufficiently to provide a flavor enhancing smoke during the grilling process,
    whereby the device after absorbing water may be used (a) to clean debris from the grilling surface, and (b) deposited on the heat source to provide a flavor enhancing smoke.

2. The device of claim 1 wherein said wood sheet has at least one edge surface adapted for use as a scraper for removing debris from the grilling surface.

3. The device of claim 1 wherein said wood sheet has two edge surfaces adapted for use as a scraper for simultaneously removing debris from the facing generally hemispherical sides of adjacent parallel rods of a grilling surface.

4. The device of claim 1 wherein the width of said fingers is between about $1/16$" and about $3/8$", and
    the distance between immediately adjacent ones of said fingers is not less than about $1/16$".

5. The device of claim 1 wherein the grain of said sheet of wood runs longitudinally of the device and said fingers.

6. The device of claim 1 wherein the length and width of said fingers and the spacing between said fingers in combination permits lateral movement and twisting of said fingers when used to clean the grilling surface.

7. A dual purpose, single use grilling surface cleaning and flavor enhancing device comprising:
    an elongated sheet of wood between about $1/32$ and $5/16$ inches in thickness and between about 1" and about 4" in width,
    said sheet of wood (a) having the capacity to provide a flavor enhancing smoke when slowly combusted, and (b) having the capacity to absorbing sufficient water to (i) resist breakage when used to clean the grilling surface and (ii) to reduce the combustibility of the device sufficiently to provide a flavor enhancing smoke during the grilling process,
    said sheet of wood having a plurality of spaced-apart fingers extending longitudinally from one longitudinal end of said sheet for use as a scraper to remove debris from a grilling surface before the grilling of food,
    the length of said fingers being between about 1" and 5",
    the width of said fingers being between about $1/16$" and about $3/8$", and
    the distance between immediately adjacent ones of said fingers being not less than about $1/16$",
    the length and width of said fingers and the distance between adjacent of said fingers combining to permit each finger to act somewhat independently of the other fingers.

8. A wooden grill brush comprising a unitary sheet of wood of substantially uniform thickness having a plurality of generally parallel slots not less than about one sixteenth of an inch in width and not less than about one inch in length extending into one edge of said sheet of wood to form wooden bristles, the length of all of said plurality of slots not being identical and the distance between adjacent ones of said plurality of slots not all being the same so that the stiffness of some of said wooden bristles is different than the stiffness of others of said wooden bristles.

9. The grill brush of claim 8 wherein the number of said parallel slots is not less than about six;
wherein said plurality of slots are between about 2 and about 4 inches in length.

10. A dual purpose, single use device for a grill overlying a heat source for cleaning the grilling surface of the grill and thereafter producing a flavor enhancing smoke device comprising:
a sheet of wood between about 1/32 and 5/16 inches in thickness and between about 1" and about 4" in width, said wood having opposed first and second ends and a handle portion between the ends thereof;
said first end defining a scraping surface at the free end thereof for scraping debris from the grilling surface;
said second end defining a plurality of spaced-apart parallel fingers extending longitudinally therefrom for use as a scraper to remove debris from the grilling surface each of said fingers being between about 1" and 5" in length, between about 1/16" and about 3/8" in width, and the distance between immediately adjacent ones of said fingers being not less than about 1/16";
the wood sheet (a) having the capacity to provide a flavor enhancing smoke when slowly combusted, and (b) having the capacity to absorbing sufficient water to (i) resist breakage when used to clean the grilling surface and (ii) to reduce the combustibility of the device sufficiently to provide a flavor enhancing smoke during the grilling process, so that the device after absorbing water may (a) be used to clean debris from the grilling surface and (b) deposited on the heat source to provide a flavor enhancing smoke.

11. The device of claim 10 having a pair of side surfaces each including a notch to receive a respective one of the facing surfaces of adjacent grill rods of the grilling surface.

12. The device of claim 10 wherein the length and width of said fingers combining to permit each finger to act somewhat independently of the other fingers.

13. The device of claim 12 wherein the length and width of said fingers permit lateral movement and twisting of said fingers when used to clean the grilling surface.

* * * * *